(12) United States Patent
Iles et al.

(10) Patent No.: US 11,218,487 B1
(45) Date of Patent: Jan. 4, 2022

(54) PREDICTIVE ENTITY RESOLUTION

(71) Applicant: INTERSET SOFTWARE, INC., Santa Clara, CA (US)

(72) Inventors: Michael Iles, Ottawa (CA); Stephan Jou, Ottawa (CA)

(73) Assignee: INTERSET SOFTWARE, INC., Santa Clara, CA (US)

( * ) Notice: Subject to any disclaimer, the term of this patent is extended or adjusted under 35 U.S.C. 154(b) by 108 days.

(21) Appl. No.: 16/555,957

(22) Filed: Aug. 29, 2019

Related U.S. Application Data

(60) Provisional application No. 62/726,604, filed on Sep. 4, 2018.

(51) Int. Cl.
*H04L 29/06* (2006.01)
*G06F 16/9035* (2019.01)
*G06F 16/17* (2019.01)
*G06N 20/00* (2019.01)

(52) U.S. Cl.
CPC ........ *H04L 63/102* (2013.01); *G06F 16/1734* (2019.01); *G06F 16/9035* (2019.01); *G06N 20/00* (2019.01); *H04L 63/0236* (2013.01); *H04L 63/107* (2013.01)

(58) Field of Classification Search
CPC . H04L 63/102; H04L 63/107; H04L 63/0236; G06N 20/00; G06F 16/9035; G06F 16/1734
USPC ............................................................ 726/3
See application file for complete search history.

(56) References Cited

U.S. PATENT DOCUMENTS

| | | | |
|---|---|---|---|
| 2018/0189467 A1* | 7/2018 | Rao ......................... | H04L 63/08 |
| 2018/0219888 A1* | 8/2018 | Apostolopoulos ........................... | H04L 63/1425 |
| 2020/0358756 A1* | 11/2020 | Rose ....................... | H04L 63/20 |

* cited by examiner

*Primary Examiner* — Dant B Shaifer Harriman

(57) ABSTRACT

Predictive entity resolution uses a set of identity models to resolve an attribute to one or more associated entities, possibly with respective probabilities, at a particular time. The predictive entity resolution generates the sets of identity models from evidence events received from evidence sources. Each evidence event has at least one attribute and an associated time stamp.

20 Claims, 6 Drawing Sheets

600

PREDICTIVE ENTITY RESOLUTION

CROSS-REFERENCE TO RELATED APPLICATIONS

This application claims priority from U.S. Provisional Application No. 62/726,604 filed Sep. 4, 2018, the entirety of which is hereby incorporated by reference for all purposes.

TECHNICAL FIELD

The current application relates to entity resolution and in particular to generating and using predictive models for entity resolution.

BACKGROUND

In computer network environments, a specific entity, such as a user, may be identified by different attributes. For example, in an Active Directory login dataset, a user may be identified by a user account name, while in a Network Flow dataset, a user may be identified by an IP address. In various applications, including in cybersecurity, it is helpful to identify an entity associated with a particular attribute, or attributes, at a given time. As an example, in cybersecurity applications it can be helpful to know the particular user that was associated with a particular IP address at some particular time.

Heuristic or rules based approaches can be useful, for example, for determining a user associated with an IP address. However these approaches require pre-defined rules, which can be labor-intensive to prepare. Further, the rules are typically based on an understanding of the particular environment and expected behaviors that are often aggregated or simplified across an organization to remove complexity. Further, while the example above of linking a user to an IP may be achieved using rules if definitive data such as DCHP logs that show the user machines being assigned the IP address are available, in general there are scenarios where definitive data to associate an entity with an attribute for a rule is not available, such as identifying a user with mobile app usage. Finally, the use of pre-defined rules makes it difficult to provide dynamic rules that can adapt to behaviors over time.

An additional, alternative and/or improved system for determining an entity associated with a particular attribute or attributes is desirable.

BRIEF DESCRIPTION OF THE DRAWINGS

Features, aspects and advantages of the present disclosure will become better understood with regard to the following description and accompanying drawings in which.

DETAILED DESCRIPTION

Figure 1:
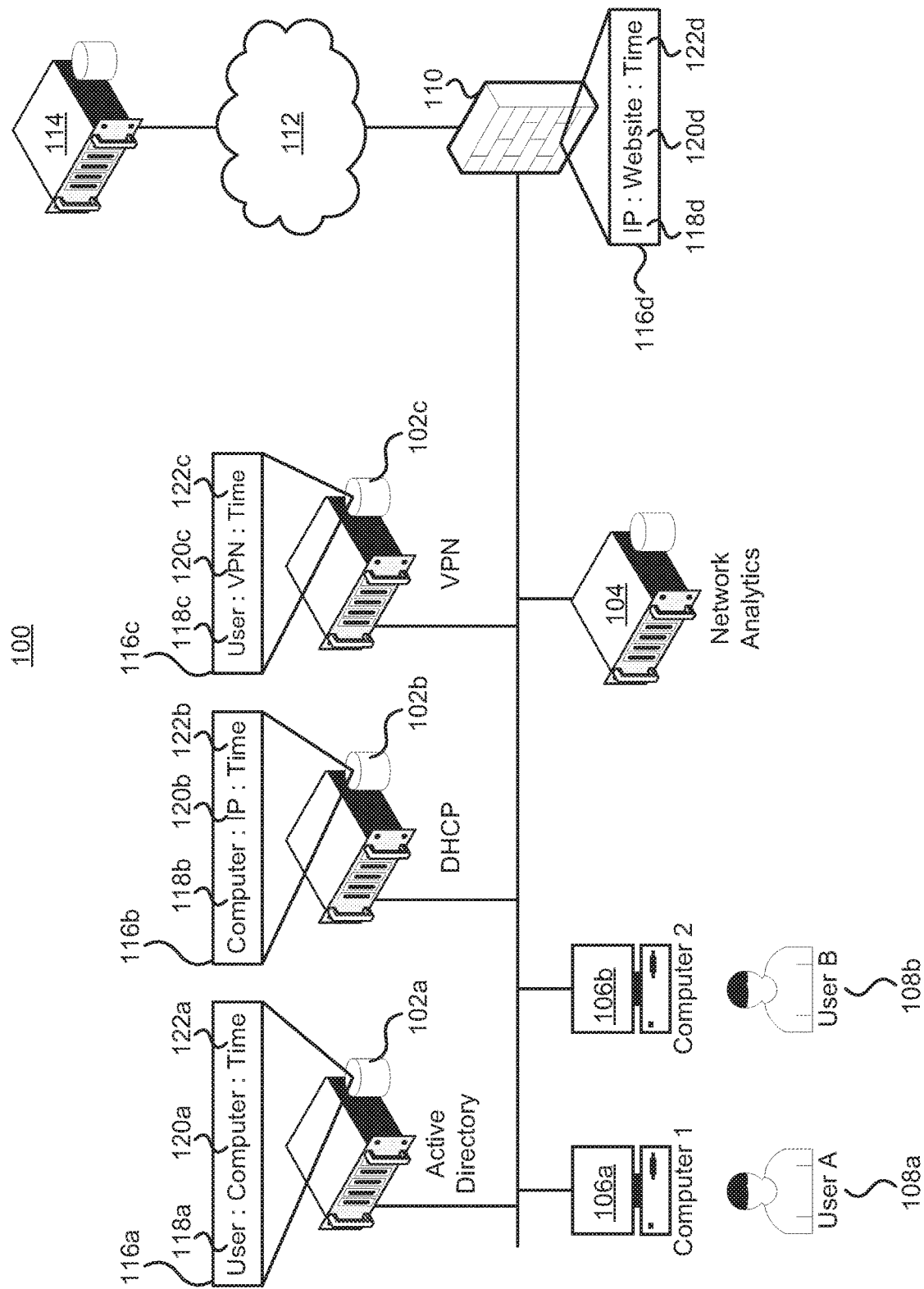
FIG. 1 depicts a network environment in which predictive entity resolution may be used.

In accordance with the present disclosure, there is provided a method of resolving a entity in a computing environment from an attribute associated with the entity, the method comprising: receiving a plurality of evidence events generated by one or more computer systems, each of the evidence events comprising an entity attribute value of an event and a timestamp of when the event occurred; generating a plurality of identity models from the evidence events, each of the plurality of identity models providing a probability of a respective entity being associated with a particular entity attribute at a particular time; storing the generated plurality of identity models; receiving a query comprising a query entity attribute and a query time; and applying the query entity attribute and query time to an identity model of the plurality of identity models to resolve a probability that an entity is associated with the query entity attribute at the query time; and returning the resolved probability in response to the received query.

In a further embodiment of the method, the plurality of evidence events are generated by one or more of: an Active Directory server; a Dynamic Host Configuration Protocol (DHCP) server; a Virtual Private Network (VPN) server a firewall system; and a Data Loss Prevention (DLP) system.

In a further embodiment of the method, generating the plurality identity models from the evidence events uses machine learning techniques.

In a further embodiment of the method, the machine learning techniques uses one or more of: supervised learning techniques; unsupervised learning techniques; and semi-supervised learning techniques.

In a further embodiment of the method, the evidence events each comprise an IP address and a user identifier.

In a further embodiment of the method, a first subset of the evidence events comprise an IP address and a computer identifier and a second subset of the evidence events comprise a computer identifier of a user identifier.

In a further embodiment, the method further comprises receiving an event; sending query comprising the query entity attribute from the received event and the query time from the event; using the returned resolved probability to enrich the received event; and storing the enriched event on an event bus.

In accordance with the present disclosure, there is provided a system for resolving a entity in a computing environment from an attribute associated with the entity, the system comprising: a processor for executing instructions; and a memory storing instructions which when executed by the processor, configure the system to: receive a plurality of evidence events generated by one or more computer systems, each of the evidence events comprising an entity attribute value of an event and a timestamp of when the event occurred; generate a plurality of identity models from the evidence events, each of the plurality of identity models providing a probability of a respective entity being associated with a particular entity attribute at a particular time; store the generated plurality of identity models; receive a query comprising a query entity attribute and a query time; apply the query entity attribute and query time to an identity model of the plurality of identity models to resolve a probability that an entity is associated with the query entity attribute at the query time; and return the resolved probability in response to the received query.

In a further embodiment of the system, the plurality of evidence events are generated by one or more of: an Active Directory server; a Dynamic Host Configuration Protocol (DHCP) server; a Virtual Private Network (VPN) server a firewall system; and a Data Loss Prevention (DLP) system.

In a further embodiment of the system, generating the plurality identity models from the evidence events uses machine learning techniques.

In a further embodiment of the system, the machine learning techniques uses one or more of: supervised learning techniques; unsupervised learning techniques; and semi-supervised learning techniques.

In a further embodiment of the system, the evidence events each comprise an IP address and a user identifier.

In a further embodiment of the system, a first subset of the evidence events comprise an IP address and a computer identifier and a second subset of the evidence events comprise a computer identifier of a user identifier.

In a further embodiment of the system, the instructions stored in the memory, when executed by the processor, further configure the system to: receive an event; send the query comprising the query entity attribute from the received event and the query time from the event; use the returned resolved probability to enrich the received event; and store the enriched event on an event bus.

Predictive entity resolution provides a probability that a particular entity is associated with a particular attribute at a given time. The predictive entity resolution is described further herein with particular reference to its application in cybersecurity in which it may be desirable to associate a user with an attribute such as a particular computer or IP address at a specific time, or range of times. While the predictive entity resolution system may be described with reference to cybersecurity, it is applicable to other systems as well. The predictive entity resolution system uses evidentiary events from one or more data sources to generate identity models that predict whether a specific entity is associated with a specific attribute. Once the identity models have been generated, they can be used to predict users associated with particular attributes, which may be used by various computer systems including security systems. The predictive entity resolution described further below allows an arbitrary combination of data sources, provided there are linked attributes in common across data source pairs, to be used in associating an entity with an attribute.

FIG. 1 depicts a network environment in which predictive entity resolution may be used. The network environment 100 comprises a local network of a number of computer systems including one or more servers that provide various functionalities. The servers 102a, 102b, 102c (referred to collectively as servers 102) provide various network services and may include, for example, an Active Directory server 102a, a Dynamic Host Configuration Protocol (DHCP) server 102b, a Virtual Private Network (VPN) server, and a network analytics server 104. The network environment 100 further includes a plurality of user computer devices 106a, 106b (referred to collectively as computer devices 106) that may be used by one or more users 108a, 108b. The servers 102, 104 and computer devices 106 may be connected together by a collection of network elements such as network switches, routers, and access points. The network may be connected to firewall device 110 through which network traffic flows between the local network and an external network 112 such as the Internet. Other computer systems 114 may access one or more services or computer devices on the local network over the external network, assuming that the firewall device 110 is suitably configured.

Each of the servers 102 may generate evidentiary events 116a, 116b, 116d, 116d (referred to collectively as evidentiary events 116) that can be used in linking an entity to an attribute. For example, the evidentiary event 116a generated by the Active Directory server 102 may include records of login events for users 118a logging into particular computers 120a and a particular time 122a. Each record associates an entity 118a, such as the user, with an attribute 120a, such as the computer, and a time stamp 122a. The evidentiary events 116b from the DHCP server 102b may associate, for example, a computer 118 with an IP address 120b and a time stamp 122b. The evidentiary events 116c from the VPN server 102c may associate, for example, a user 118c with a VPN connection 120c and a timestamp 122c. It will be appreciated that the particular servers 102 and the evidentiary events depicted in FIG. 1 are intended to be illustrative only and other sources of evidentiary events, as well as other types of evidentiary events are possible. The evidentiary event sources are able to provide the evidentiary events to a network analytics system 104 that can process the evidentiary events in order to create, or dynamically update identity models that can predict the probability that an entity is associated with a particular attribute at a given time. The identity models may be generated from evidentiary events that occur over a period of time, such as a month although timer periods both shorter and longer are possible, sufficient to establish enough events to provide predictions for entity resolution. Once the identity models have been generated, they can be updated from new evidentiary events. Further, as new entities are detected in the evidentiary events, new identity models can be generated.

Figure 2A:
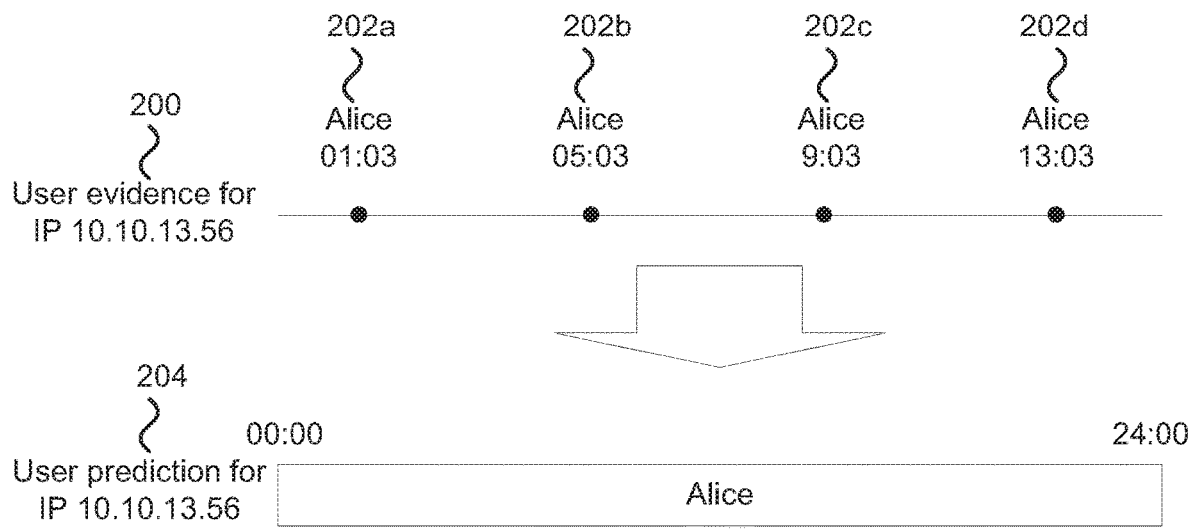
FIG. 2A and FIG. 2B depict entity predictions for particular entity evidence.
Figure 2B:
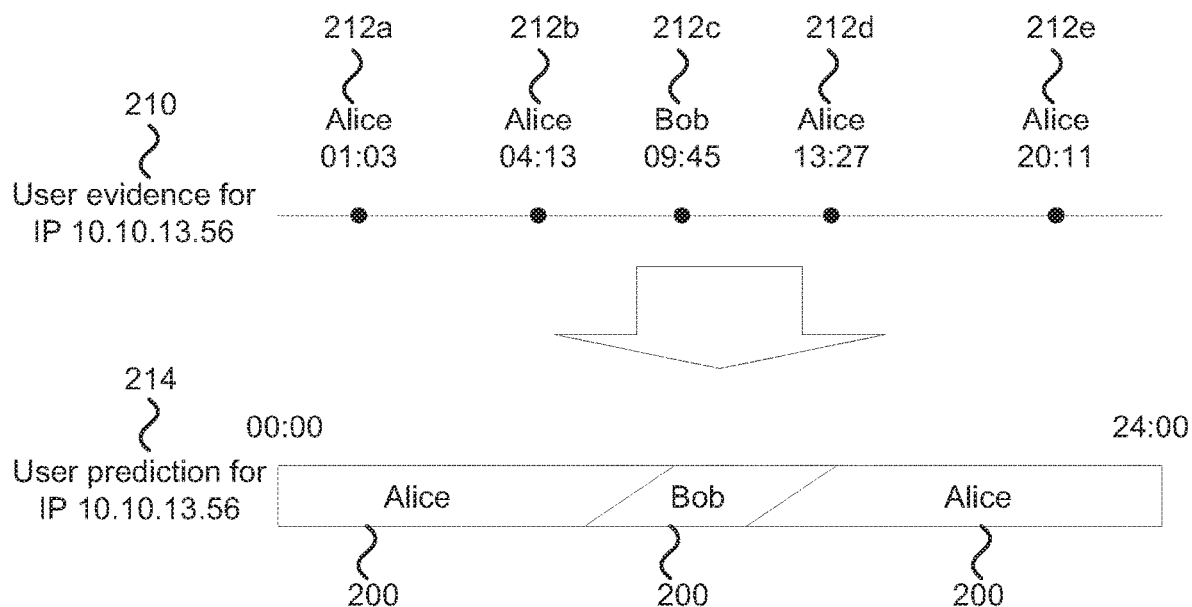

FIG. 2A and FIG. 2B depict entity predictions for particular entity evidence. FIG. 2A depicts a number of evidentiary events that provide user evidence 202 for a particular IP address. The user evidence 202 may include evidentiary events generated from one or more evidentiary sources. For example, when linking a user to an IP address as depicted in FIG. 2A, evidentiary events from both an Active Directory server that can associate a user with a particular computer, as well as evidentiary events from a DHCP server that can associate a particular computer with an IP address may be used. The user evidence 202 may comprise a number of entries 204a, 204b, 204c, 204d such as periodic DHCP requests or renewals assigning the IP address to a particular computer are depicted as occurring at a particular time. Such user evidence may result in the user prediction 206, namely that during the particular time period, the user Alice was associated with the particular IP address.

In FIG. 2A the assumed evidentiary sources may be considered authoritative, that is the DHCP server may be the authority for assigning an IP address to a particular computer and so will have correct information for what IP address a particular computer was assigned at different times. Similarly, the Active Directory server may provide authoritative evidence entries for linking a user to a computer. In the case of authoritative sources, the user prediction may also be authoritative.

It is not always possible to have authoritative evidentiary sources. For example, if no DHCP records are maintained, it may not be possible to know with certainty what IP address a computer was using at a particular time. Other sources of user evidence may be useful, although not authoritative in determining what user was associated with an IP address. For example an Active Directory event 4768 indicates that a Kerberos authentication ticket (TGT) was requested. The event includes the name of the user who logged in and the IP address that they logged in from. Accordingly, the event may provide a link between the IP address and a user. However, it is possible that a different user was assigned the IP address at some time before the Kerberos event, and as such, the further away from the event, the less reliable the link between the IP address and user.

FIG. 2B depicts user evidence 210 linking a user to an IP address. The depicted events may be for example Active Directory events 4768. Events 212a, 212b, 212d, 212e associate the user Alice with the particular IP address, while event 212c associates the user Bob with the same particular IP address. Accordingly, at some point in time between event 212b and 212c the IP address 10.10.13.56 was associated with the user Bob. Similarly, at some point in time between event 212c and 212d the IP address 10.10.13.56 was again associated with Alice. As depicted, the user prediction map 214 for the user evidence 210, indicate that Alice is associated with the IP address for a first time range 216a, and then Bob is associated with the IP address for a second time range 216b, before Alice being associated with the IP address for a third time range 216c. As depicted by the angled lines of the second time range 216b, there is a time where it is uncertain whether the IP address is associated with the user Alice or Bob. As the time approaches the event 212c, the certainty that the IP address is associated with Bob increases and the certainty that the IP address is associated with Alice decreases.

As depicted in both FIG. 2A and FIG. 2B, it is possible to build a map or model of what user was likely associated with the particular IP address. This map information may be used when processing other events to provide improved insights into the events. For example, when processing web proxy events, which contain only IP addresses, the map information may be used in order to predict which entity was associated with the IP address at the time of the web proxy event. The resolved entity information, which may include one or more entities along with probability information, can then be used to enrich the web proxy information to identify possible users associated with the web proxy events.

As a further example, a user may consistently sign on to a particular computer, for example because it has been assigned to the user, and there is strong evidence that the actual user signed on to the computer, for example because the user was successfully authenticated using two factor authentication (2FA), then this may be used as a high probability evidentiary event. If the user appears on a second computer, which the user has not previously signed in from, at an unusual time, then the sign in may be provide a low probability evidentiary event.

Figure 3:
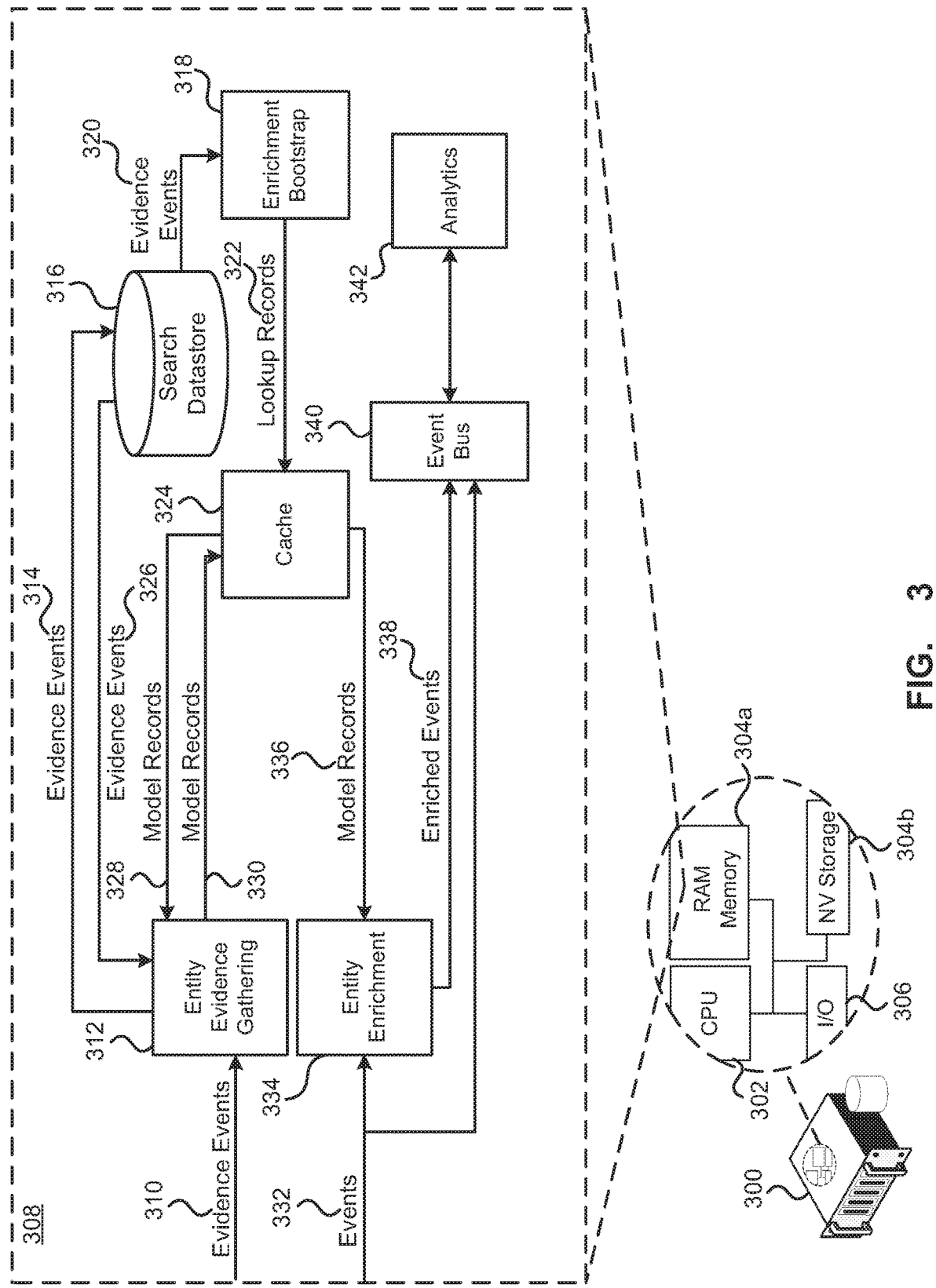
FIG. 3 depicts components of a predictive entity resolution system.

FIG. 3 depicts components of a predictive entity resolution system. The predictive entity resolution system is depicted as being implemented in a single server 300, however it will be appreciated that the described functionality may be implemented across multiple servers. The server 300 comprises a central processing unit (CPU) 302 that executes instructions in order to configure the server 300 to provide specific functionality. The instructions for execution are stored in memory that may include both volatile random access memory 304a as well as non-volatile storage 304b such as provided by hard disk drives, solid state drives or other storage technologies. The server 300 further includes one or more input/output (I/O) interfaces 306 for connecting the server 300 to other components or systems. For example, the I/O interface 306 may provide a network connection for connecting the server 300 to a network.

When stored instructions are executed by the CPU 302, the server is configured to provide entity resolution functionality 308. The entity resolution functionality will be described with reference to processing of Kerberos events 4768 as the evidentiary events and using the generated models mapping an IP to one or more users to enrich web proxy events. The Kerberos evidence events 310 are received at an evidence gathering component 312. The evidence gathering component 312 uses the received evidence events to update existing records. If there is no existing record, for example because the system has just started collecting evidentiary events, or if the entity or attribute has not been seen before, the records must first be generated. The evidence gathering component 312 passes evidence events to a data store 316 for storage and retrieval. When initially generating the models, an enrichment bootstrap component 318 may use evidence events that have been stored over a period of time, such as a few weeks to a month or more, in order to generate the models that map entities to attributes at particular times. The models may map the entities to attributes in various ways. For example, as described above, a model map may be generated for a particular attribute, such as the IP address, and may map different entities, such as the user name, to the particular attribute at different times. Alternatively, a model map may be generated for a particular entity, such as the user name, and may map different attributes, such as the IP address, to the particular entity at different times. Once the models have been generated by the bootstrap component 318, the model may be saved to a cache 324, or other storage, for retrieval by other components.

Once the initial models have been generated by the bootstrap component 318, they may be periodically updated by the evidence gathering component 312. As a new evidence event 310 is received, the evidence gathering component 312 may retrieve an appropriate model record 328. For example, if each model maps a specific IP address to one or more user names, the IP address of the newly received evidence even may be used to retrieve the corresponding model. Once the model has been retrieved, it can be updated to incorporate the new information of the evidence event. Additionally, depending upon the model, other evidence events may be retrieved from the data store 316 in order to update the model. For example, if the model maps a user to an IP address and the received evidence event 310 provides an association between an IP address and a particular computer, evidence events that link a computer to a user may be retrieved in order to update the model. Alternatively, if the entity resolution system maintains multiple different types of models, such as a model that maps a computer to user names, the evidence event may be combined with an existing model in order to update a second model. Once the model has been updated, the evidence gathering component 312 returns the updated model 330 to be stored in the model cache 323.

The models stored in the model cache 324 may be used in numerous ways. For example, as depicted in FIG. 3, the models may be used to enrich other events to improve subsequent processing or analysis. New events 332 may be received at an entity enrichment component 334. The events 332 may include a timestamp and an attribute, such as an IP address. The attribute of the received event is used to retrieve a model record 336 from the model cache 324 and used to determine one or more entities with associated probabilities of being associated with the particular attribute at the time indicated by the timestamp in the received event. The entity enrichment component 334 uses the entities resolved by the model to enrich the received event 332. Enriching the event may comprise adding the resolved entity, or entities, along with their probabilities, to a field of the event data structure, or may comprise replacing an existing field with the resolved entity, or entities, along with their probabilities. Other ways of enriching the event 332 with the entity information will be apparent to one of ordinary skill in the art. The enriched events 338 may be passed to an event bus 340 that can provide temporary or semi-permanent storage of the enriched events. The raw events 332 received may also be passed to the event bus. The event bus 340 provides functionality for distributing the enriched events, and possibly the raw events, to other systems or components. The receiving components may be registered with the event bus to receive specific data, such as raw events or enriched events. For example, an analytics component 342 may register to receive all enriched events from the event bus. The analysis component 342 may process enriched events to detect possible threats. For example, if the events are NetFlow™ events, the enriched events may indicate that the user Bob, was accessing a particular web site known to host viruses. By analyzing the enriched data, greater insight into possible security threats may be provided.

Figure 4:
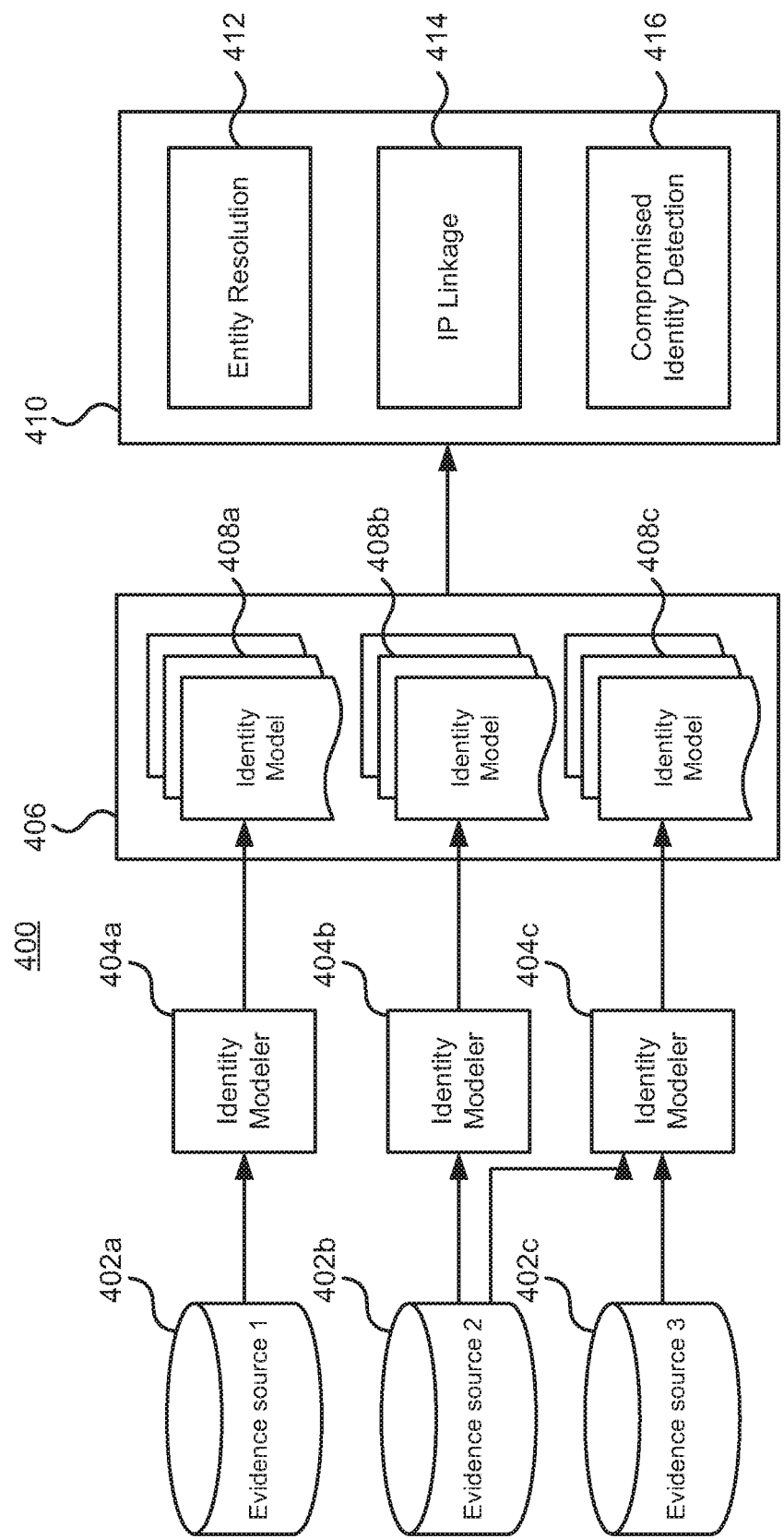
FIG. 4 depict components of a further predictive entity resolution system.

FIG. 4 depict components of a further predictive entity resolution system. The system 400 collects evidence of relationships between an entity and an attribute at a particular time. A number of different evidence sources 402a, 402b, 402c (referred to collectively as evidence sources 402) provide data as records, tables, n-tuples, or other suitable data structures and each comprise at least a timestamp and one or more attributes, or more particularly attribute values. The evidence source may include records from various network systems such as Active Directory records that provide a login time and a user's login account, firewall traffic logs that contain a network access time and an IP address, or endpoint Data Loss Prevention (DLP) records that provide a timestamp, a Windows login identity and a file operation. The evidence sources 402 may provide the evidence data to one or more identity modelers 404a, 404b, 404 (referred to collectively as identity modelers 404). Each of the identity modelers can generate a set of identity models, based on the received data from one or more evidence sources 402, that will predict the probability of an entity being associated with a given attribute at a particular time. The identity modelers 404 may generate an individual model for each unique attribute value with each of the models providing one or more entities associated with the attribute at different times, along with their probabilities. The identity modeler can take into account the semantics of the evidence source, which can include, for example, how probable the entity in question will remain associated with the attribute beyond the associated timestamp or between timestamped observations as well as the noise or trustworthiness of the evidence source or sources. The identity modelers 404 may use analytical methods, including machine learning, to generate identity models that predict that a specific entity, such as a named human user, is associated with a specific attribute, such as an IP address, a Windows NT login, or a VPN record. The machine learning may be supervised, in which a labelled set of evidence events that have been labelled with the associated entity are provided for training the identity models, or unsupervised that uses the data from the evidence sources 402 without being labelled with the associated entity, or semi-supervised, a combination of the two aforementioned approaches. The use of machine learning to generate the identity models can take into account historical behavior of the entities and entity attributes within the network environment, which may include for example, the typical historical behavior of given entity within the particular evidence source and the degree of anomalousness of the behavior of a given entity compared to other entities in the population, such as other users in the same peer group, or other machines in the same network segment, or other entities in the same statistical cluster. Once the identity modelers 402 have created the set of identity models, the models can be stored in a repository 406. The repository 406 may store the different sets of identity models 408a, 408b, 408c (referred to collectively as identity models 408) as model coefficients and other intermediate statistics. As a result the identity models in the repository can provide a very compact representation of all the information in the evidence data source. If the evidentiary events used by the identity modelers are not required to be stored for other purposes, significant storage space may be saved by storing only the identity models instead of persisting the original evidence source records. The repository 406 can provide access to the identity models 408 to one or more analytics systems 410. The analytics systems 410 may be viewed as consumers of the identity models and may query one or more of the identity models 408 in order to perform entity resolution tasks. The analytics system 410 may include entity resolution functionality 412 for resolving an attribute to an entity. IP linkage functionality 414 may be a specific case of entity resolution in which an IP address is resolved to one or more users. Compromised identity detection functionality 416 may use the identity models to detect if a user account has been potentially compromised.

Figure 5:
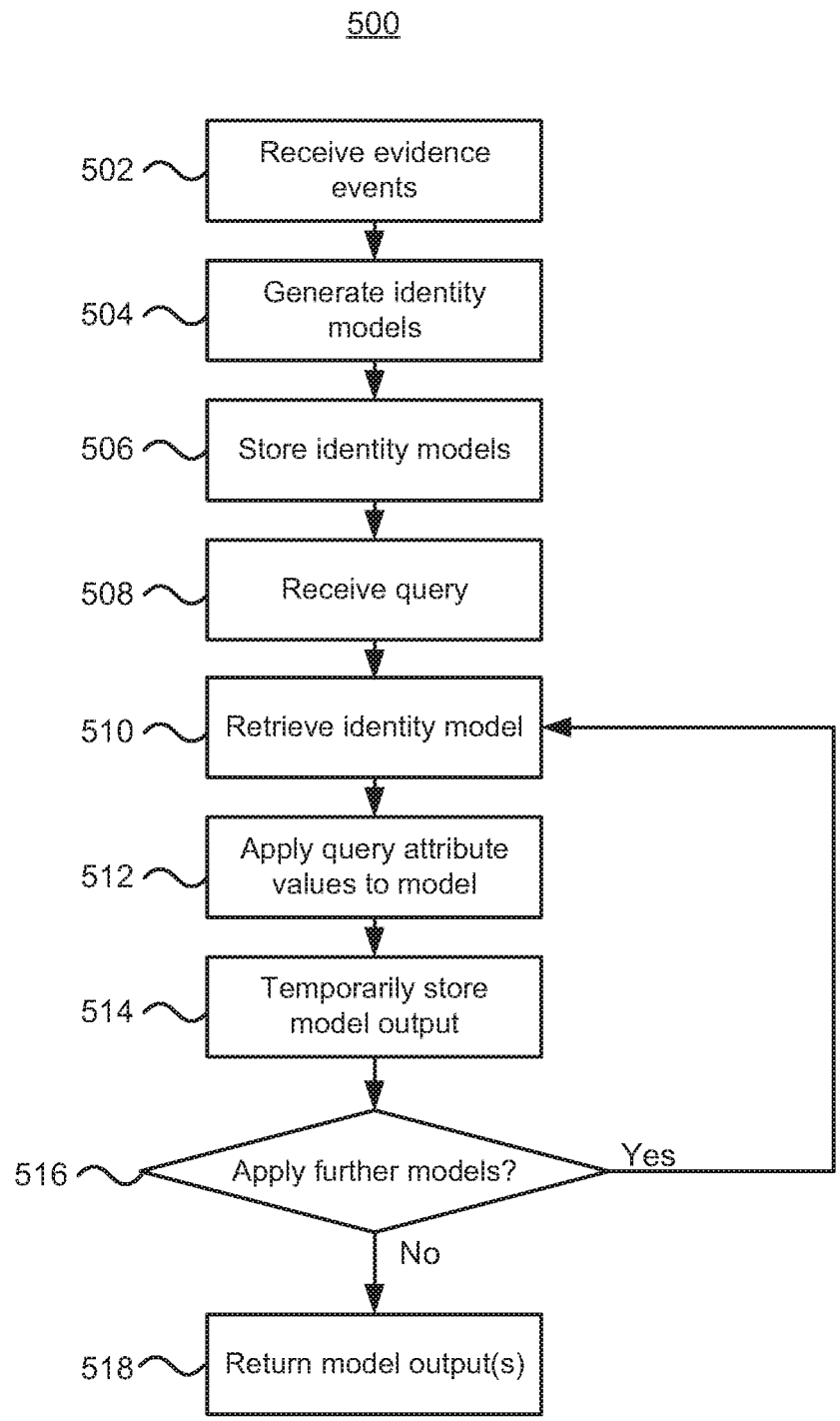
FIG. 5 depicts a method of performing predictive entity resolution system.

FIG. 5 depicts a method of performing predictive entity resolution. The method 500 may be implemented by execution of stored instructions by one or more processing units. The method 500 depicts steps of performing predictive entity resolution by building identity models and then querying the identity models. The method 500 receives a plurality of evidence events (502). Each of the evidence events may be provided from one or more different evidence sources that provide a record linking a time with at least one attribute. A set of identity models are generated (504), each for predicting the probability that a particular entity was associated with a particular attribute at a particular time. The set of identity models are stored (506) in a repository. Once the identity models have been stored, they can be queried. A query is received (508), which may be provided by a user, such as a cybersecurity professional, or from an automated system. The query may specify one or more attributes values and time or time range as well as possibly the type of entity, such as a user or machine, that the attribute values should be resolved to. The received query is used to retrieve one or more identity models. Each model may be retrieved (510) based on one or more of the attributes in the query, or the entity to be resolved in the query. Once retrieved, the attribute values are applied to the retrieved identity model (512), the results that provide a probability that a specific user is associated with the attribute value at the specific time are stored, at least temporarily (514). If there are other identity models to apply the query to (Yes at 516) the next identity model is retrieved (510) and the attribute values applied to it (512). Once all of the identity models for the query have been processed (No at 516), the model outputs that were temporarily saved may be returned (518) in response to the received query. Although not depicted in FIG. 5, prior to returning the results, the results may be processed. For example, if the results provide a plurality of different possible entities, the results may be processed to remove those results that have a probability below a certain threshold. The threshold could be a pre-set default threshold value, or specified as part of the query. Additionally or alternatively, the results may be combined together in order to provide a desired result to the query. For example, if the query requested the user associated with an IP address at some time, results from a model associating the IP address with a computer and model results associating the computer with a user may be combined together.

Figure 6:
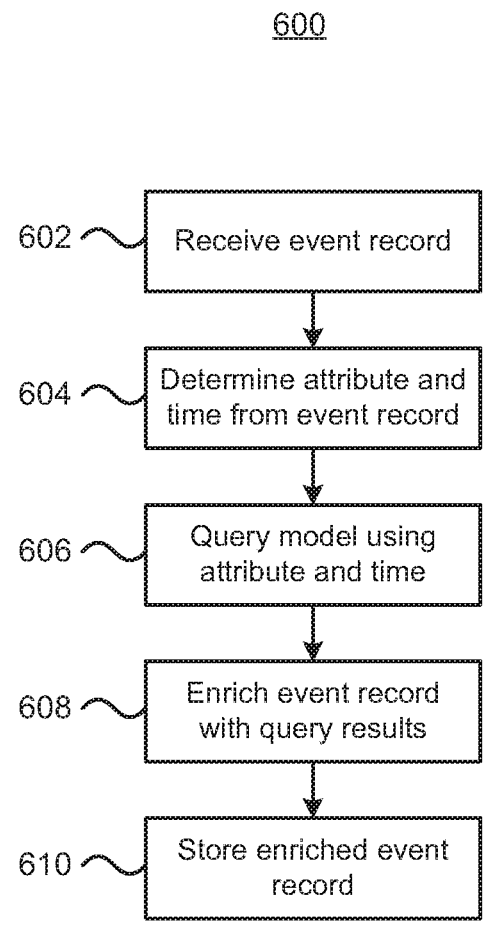
FIG. 6 depicts a further method of performing predictive entity resolution.

FIG. 6 depicts a further method of performing predictive entity resolution. The method 600 depicts the use of predictive entity resolution for enriching event records. The method 600 assumes that identity models have already been generated from a plurality of evidence events as described above in FIG. 5 steps 502-506. The method 600 may be implemented in a server by executing instructions that are stored in memory. When the stored instructions are executed by the server's processor, the server is configured to perform the described method. The server receives an event record (602) that includes an attribute and possibly a timestamp. If the event record does not include a timestamp, the event record may be associated with a timestamp of when the event record was received. The event record is processed to determine the attribute, or more particularly the attribute value, and a time (604). The determined attribute and time are used to query the identity models (608) which results in a predicted entity associated with the attribute at the time. The query results are used to enrich the received event record (608). The enrichment may comprise adding the query results to the event record as a new field or tag, or may modify one or more existing fields or tags. Once the event record has been enriched it is stored (610). The event record may be stored in a repository or other structure such as an event bus. The stored events may be further processed by one or more computer systems.

As described above, identity models may be generated from numerous evidence events and then used for resolving an attribute to an entity. The use of the entity models provides various benefits over previous heuristic and/or rules based approaches to determining an entity associated with an attribute at some time. In previous rules based approaches, the rules need to be defined, which can be labor-intensive, require custom development, or difficult to complete in advance when the number and specific set of evidence data sources is unknown or unpredictable. For example, many security solutions today that perform entity resolution requires DCHP records, to connect IP addresses to computers; however, this data is not always available. The predictive entity resolution described above works on any arbitrary combination of data sources, provided there are linked attributes in common across data source pairs. Further, in previous rules based approaches the rules are based on an a priori understanding of a set of behaviors, aggregated and/or simplified across the organization to avoid excessive complexity. For example, a record that indicates a user connecting from an IP address located in China may be considered less authoritative than a login record from a corporate-assigned notebook, and as a result, the entity resolution rules may take that information into account (e.g. if user Bob is seen logging in from the notebook, then assign the notebook's IP address to the user entity rather than the login from China; in other words, a rule may specify that corporate notebook logins are more authoritative than VPN login records when they conflict). However, such rules do not provide great insight if the user entity in question frequently travels to China on business, or the notebook in question has been stolen and is actually being used by someone other than user Bob. In other words, the use of rules can lead to a lot of noise and inaccuracy. The predictive entity resolution described above allows for the use of machine learning and probabilistic models to, at an individual level, learn the unique probability of every entity's behavior for any given data source, to allow for a more accurate, probabilistic approach to entity resolution. Further still, in rules based approaches the rules are not dynamic, and will require updates when the behaviors of the entities change over time (e.g. users change job roles or relocate, new machines are added to the network). The predictive entity resolution described above uses machine learning, and therefore standard approaches within machine learning to adapt to changing datasets and behaviors make the approach self-updating to a large extent.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

In various embodiments devices, systems and methods described herein are implemented using one or more components or modules to perform the steps corresponding to one or more methods. Such components or modules may be implemented using software executed by computing hardware. In some embodiments each component or module is implemented by executing stored instructions to configure a general purpose processor to provide the component or module functionality. Many of the above described methods or method steps can be implemented using machine executable instructions, such as software, included in a machine readable medium such as a memory device, e.g., RAM, CD, DVD, flash memory, disk, etc. to control a machine, e.g., general purpose computer with or without additional hardware, to implement all or portions of the above described methods in one or more physical computer systems. Accordingly, among other things, various embodiments are directed to a machine-readable medium e.g., a non-transitory computer readable medium or memory, including machine executable instructions for causing a machine, e.g., processor and/or associated hardware, to perform one or more or all of the steps of the above-described method(s). Some embodiments are directed to a device including a processor configured to implement one, multiple or all of the steps of one or more methods of the invention.

Numerous additional variations on the methods and apparatus of the various embodiments described above will be apparent to those skilled in the art in view of the above description. Such variations are to be considered within the scope.

What is claimed is:

1. A method of resolving an entity in a computing environment from an attribute associated with the entity, the method comprising:
   receiving a plurality of evidence events generated by one or more computer systems, each of the plurality of evidence events comprising an entity attribute value for an event and a timestamp of when the event occurred;

analyzing historical behavior associated with a plurality of different possible entities, including determining a probability that the entity will remain associated with the attribute beyond an associated timestamp and a degree of anomalousness of behavior of the entity compared to other entities in a population;

generating, utilizing the analyzed historical behavior, a plurality of identity models from the plurality of evidence events, each of the plurality of identity models providing a probability of a respective entity being associated with a particular entity attribute at a particular time, wherein the respective entity is considered from among the plurality of different possible entities;

storing the plurality of identity models;

receiving a query comprising a query entity attribute and a query time;

applying the query entity attribute and the query time to an identity model of the plurality of identity models to resolve a probability that a queried entity is associated with the query entity attribute at the query time; and returning the probability in response to the query.

2. The method of claim 1, wherein the plurality of evidence events are generated by one or more of:
an Active Directory server;
a Dynamic Host Configuration Protocol (DHCP) server;
a Virtual Private Network (VPN) server;
a firewall system; and
a Data Loss Prevention (DLP) system.

3. The method of claim 1, wherein generating the plurality identity models from the plurality of evidence events uses machine learning techniques.

4. The method of claim 3, wherein the machine learning techniques uses one or more of:
supervised learning techniques;
unsupervised learning techniques; and
semi-supervised learning techniques.

5. The method of claim 1, wherein the plurality of evidence events each comprise an Internet Protocol (IP) address and a user identifier.

6. The method of claim 1, wherein a first subset of the plurality of evidence events comprise an Internet Protocol (IP) address and a computer identifier and a second subset of the plurality of evidence events comprise a computer identifier of a user identifier.

7. The method of claim 1, further comprising:
receiving an event to be queried;
sending a query comprising a query entity attribute from the event to be queried and a query time from the event to be queried;
using a returned resolved probability to enrich the event to be queried, including adding a resolved entity along with the returned resolved probability to a field of an event data structure or replacing an existing field of the event data structure with the resolved entity along with the returned resolved probability; and
storing an enriched event on an event bus.

8. A system for resolving an entity in a computing environment from an attribute associated with the entity, the system comprising:
a processor for executing instructions; and
a memory storing instructions which when executed by the processor, cause the processor to:
receive a plurality of evidence events generated by one or more computer systems, each of the plurality of evidence events comprising an entity attribute value for an event and a timestamp of when the event occurred;
analyze historical behavior associated with a plurality of different possible entities, including determining a probability that the entity will remain associated with the attribute beyond an associated timestamp and a degree of anomalousness of behavior of the entity compared to other entities in a population;

generate, utilizing the analyzed historical behavior, a plurality of identity models from the plurality of evidence events, each of the plurality of identity models providing a probability of a respective entity being associated with a particular entity attribute at a particular time; wherein the respective entity is considered among the plurality of different possible entities;

store the plurality of identity models;

receive a query comprising a query entity attribute and a query time;

apply the query entity attribute and the query time to an identity model of the plurality of identity models to resolve a probability that a queried entity is associated with the query entity attribute at the query time; and return the probability in response to the query.

9. The system of claim 8, wherein the plurality of evidence events are generated by one or more of:
an Active Directory server;
a Dynamic Host Configuration Protocol (DHCP) server;
a Virtual Private Network (VPN) server;
a firewall system; and
a Data Loss Prevention (DLP) system.

10. The system of claim 8, wherein generating the plurality identity models from the plurality of evidence events uses machine learning techniques.

11. The system of claim 10, wherein the machine learning techniques uses one or more of:
supervised learning techniques;
unsupervised learning techniques; and
semi-supervised learning techniques.

12. The system of claim 8, wherein the plurality of evidence events each comprise an Internet Protocol (IP) address and a user identifier.

13. The system of claim 8, wherein a first subset of the plurality of evidence events comprise an Internet Protocol (IP) address and a computer identifier and a second subset of the plurality of evidence events comprise a computer identifier of a user identifier.

14. The system of claim 8, wherein the instructions stored in the memory, when executed by the processor, further cause the processor to:
receive an event to be queried;
send the query comprising a query entity attribute from the event to be queried and a query time from the event to be queried;
use a returned resolved probability to enrich the event to be queried, including adding a resolved entity along with the returned resolved probability to a field of an event data structure or replacing an existing field of the event data structure with the resolved entity along with the returned resolved probability; and
store an enriched event on an event bus.

15. A non-transitory computer readable memory containing instructions for execution by a processor, the instructions for resolving an entity in a computing environment from an attribute associated with the entity by:
receiving a plurality of evidence events generated by one or more computer systems, each of the plurality of evidence events comprising an entity attribute value for an event and a timestamp of when the event occurred;

analyzing historical behavior associated with a plurality of different possible entities, including determining a probability that the entity will remain associated with the attribute beyond an associated timestamp and a degree of anomalousness of behavior of the entity compared to other entities in a population;

generating, utilizing the analyzed historical behavior, a plurality of identity models from the plurality of evidence events, each of the plurality of identity models providing a probability of a respective entity being associated with a particular entity attribute at a particular time, wherein the respective entity is considered among the plurality of different possible entities;

storing the plurality of identity models;

receiving a query comprising a query entity attribute and a query time;

applying the query entity attribute and the query time to an identity model of the plurality of identity models to resolve a probability that a queried entity is associated with the query entity attribute at the query time; and returning the probability in response to the query.

16. The non-transitory computer readable memory of claim 15, wherein the respective entity includes a named human user.

17. The non-transitory computer readable memory of claim 15, wherein the particular entity attribute includes an Internet Protocol (IP) address, a Windows NT login or a virtual private network (VPN) record.

18. The method of claim 1, wherein the respective entity includes a named human user.

19. The system of claim 8, wherein the particular entity attribute includes an Internet Protocol (IP) address, a Windows NT login or a virtual private network (VPN) record.

20. The system of claim 8, wherein the respective entity includes a named human user.

* * * * *